Nov. 16, 1965    H. A. AQUINO ETAL    3,217,664
LOAD PARTITIONING DEVICE FOR FREIGHT VEHICLES
Original Filed Oct. 30, 1961    7 Sheets-Sheet 1

INVENTORS.
HERMAN A. AQUINO
GEORGE F. BRIDGES
WILLIAM R. SHAVER

Nov. 16, 1965 H. A. AQUINO ETAL 3,217,664
LOAD PARTITIONING DEVICE FOR FREIGHT VEHICLES
Original Filed Oct. 30, 1961 7 Sheets-Sheet 3

INVENTORS.
HERMAN A. AQUINO
GEORGE F. BRIDGES
WILLIAM R. SHAVER
By Wayne Morris Russell
ATTY.

United States Patent Office 3,217,664
Patented Nov. 16, 1965

3,217,664
LOAD PARTITIONING DEVICE FOR FREIGHT VEHICLES
Herman A. Aquino, Lisle, and George F. Bridges, Chicago, Ill., and William R. Shaver, Hammond, Ind., assignors to Pullman Incorporated, Chicago, Ill., a corporation of Delaware
Continuation of application Ser. No. 148,529, Oct. 30, 1961. This application Jan. 21, 1965, Ser. No. 428,606
8 Claims. (Cl. 105—376)

This is a continuation of application Serial No. 148,529, filed October 30, 1961.

The present invention relates to arrangements for bracing loads within freight vehicles and, more particularly, relates to bracing devices of the type which are adjustable lengthwise of the vehicle for partitioning or dividing the latter into compartments.

It is a principal object of the invention to provide a new and improved load dividing device of the above described type which is easily adjustable lengthwise of the car to selective positions and which may be easily moved out of its load dividing position to a stored position adjacent the side walls of the vehicle.

It is a further object to provide a new and improved load dividing device having locking devices constructed and arranged so as to retain the device locked in a lengthwise load dividing position and said locking device also being operative to provide a pivot for the load dividing device about which the latter may be turned to its stored position.

It is another object to provide a load dividing device having a partitioning member formed of a minimum weight.

It is a still further object to provide a load dividing device having a new and improved carriage arrangement supporting a partitioning member thereon so as to facilitate the lengthwise movement of the load dividing device and to permit ease in movement of the partitioning member to a stored position.

It is still another object of the invention to provide an improved arrangement for housing the locking devices in the partitioning element so as to facilitate the assembly and repair thereof.

It is another object to provide a new and novel means for maintaining an operative connection between the partitioning member and the carriage so that the partitioning member is supported for movement with said carriage during lengthwise positioning thereof and is substantially free of any support from said carriage during movement of the partition to a stored position.

It is yet another object to provide a new and novel load dividing arrangement including a plurality of load dividing or partitioning devices which are arranged to be selectively positioned lengthwise of the car into planes parallel and transverse to the side walls of the freight vehicle with which it is employed to provide varied and numerous different partitioning arrangements.

Further objects and features will hereinafter appear.

Referring now to the figures, the load partitioning arrangement 10 of the present invention is embodied in a railroad car 11 including the usual side walls 13 and 15, roof 17 and flooring 19 supported on the transversely extending underframe members 21 in a more or less conventional manner.

In the form shown, the partitioning arrangement 10 includes a pair of side-by-side partitioning devices 23 and 25 sized so that when they are positioned transversely of the car, they provide a substantially continuous wall. The partitioning devices 23 and 25 are each retained and movably supported in the car by way of two sets of upper parallel rails 27 and 29. Cooperating with the upper sets of rails 27 and 29 to retain the devices 23 and 25 positioned are lower keeper rails 31 and 33.

The upper rails 27 of each set are spaced from the respective side walls 13 and 15 and are each formed from a channel having a substantially C-section and including a lower substantially horizontal flange 35 and a substantially vertical upstanding flange 37 which is disposed to face the center of the car. The channels 29 are similarly formed and also include horizontal flanges 35 and upstanding flanges 37 which are arranged to face the respective side walls 13 and 15. The rails 29 of each set are spaced from each other sufficiently to permit relative turning of the partitioning devices 23 and 25 as more fully to be explained hereinafter. The rails 27 and 29 are each fixedly secured to the top wall 17 of the car as by bolts 39 or the like.

The keeper rails 31 are formed from channel members of substantially hat-shaped section and include a horizontal web 41. The keeper rail 33 is similarly shaped, but the horizontal web 48 is wider to accommodate both of the partitioning devices 23. Supporting the keeper rails 31 and 33, so that the respective horizontal webs 41 and 43 are substantially in the same plane as the floor 17, are brackets 45 which are suitably secured to the underframe members 21.

The partitioning devices 23 and 25 each include generally a partition member or gate 47, a carriage assembly 49, a suspension assembly 51 connecting the carriage assembly 49 to the gate 47, and locking devices 53 in the gate cooperative with the rails and keepers 27, 29, 31 and 33 to selectively lock the gate lengthwise of the car and to provide a turning axis about which the gate 47 may be turned.

The partition member or gate 47 is preferably constructed so as to be of minimum weight and, at the same time, be capable of withstanding the stresses usually associated with load dividing or compartmentizer types of gate constructions. This is accomplished by employing a "core stabilized shell" construction. The expression "core stabilized shell construction" as used herein defines a gate construction including a shell formed by channel members defining the top, bottom and side edge portions of the gate and facing plates separated by a core of honeycomb material bonded thereto and which serves to distribute the sheer flow of a bending force applied on the face of the gate along the mating bonded surface of the facing and the honeycomb to the channel members such that substantially all of the shear stress is assumed by the shell.

Figure 1:
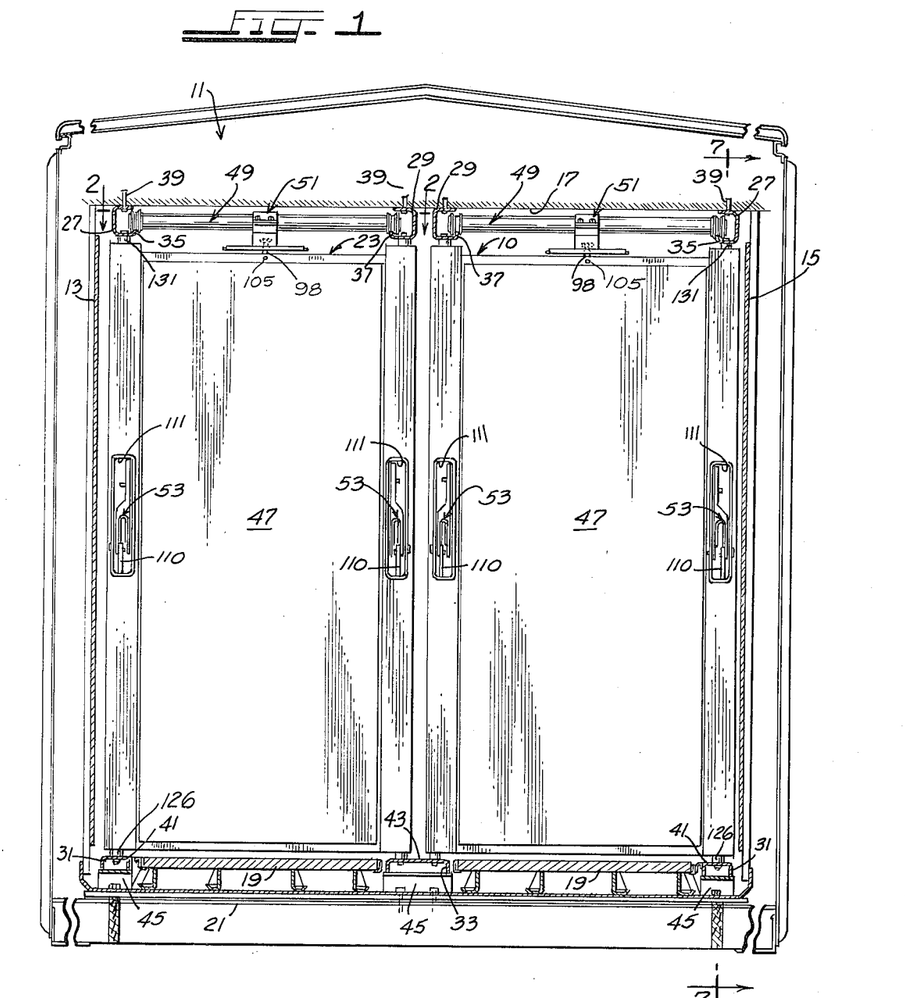
FIG. 1 is a diagrammatic view in elevation of a railroad car embodying the load dividing arrangement of the present invention.
Figure 2:
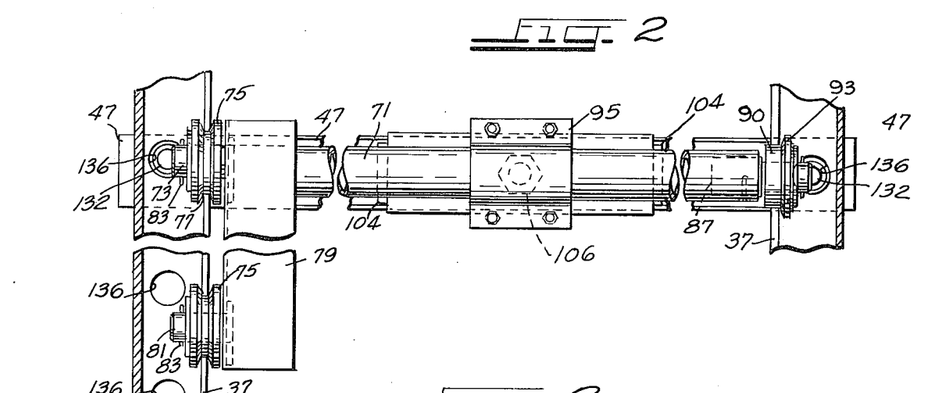
FIG. 2 is a fragmentary top plan view partially in section taken substantially along the lines 2—2 of FIG. 1, showing the carriage rollably supported on the track structure and the partitioning gate suspended from the carriage.
Figure 3:
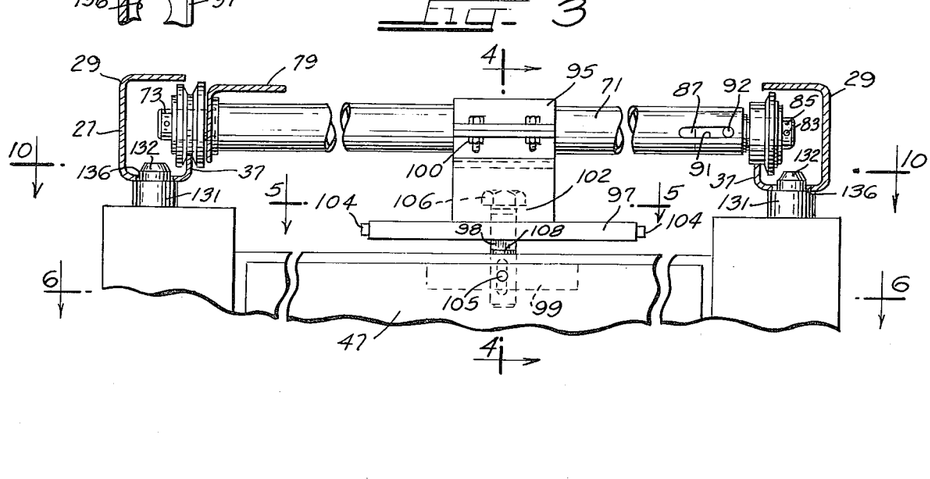
FIG. 3 is a fragmentary front elevational view similar to FIG. 2.
Figures 4, 9:
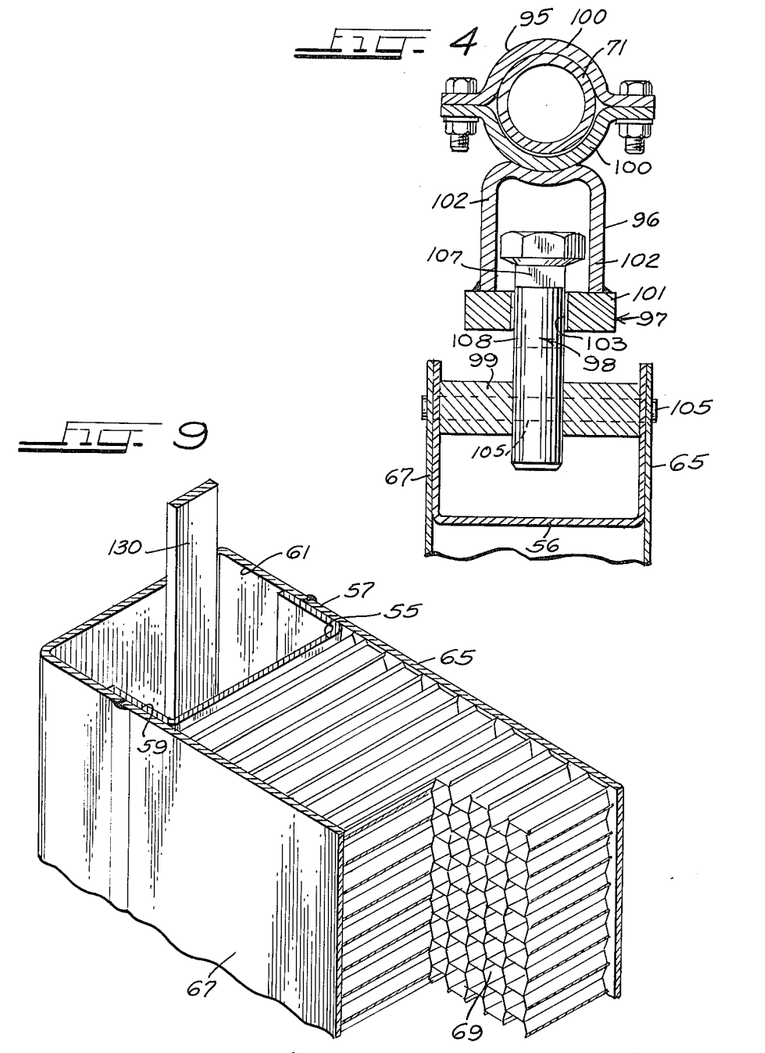
FIG. 4 is a fragmentary cross-sectional view taken substantially along the lines 4—4 of FIG. 3, showing the arrangement for suspending the partitioning gate from the arrangement.
FIG. 9 is a fragmentary perspective view of a section of the gate showing, in particular, the inner core structure.
Figure 5:
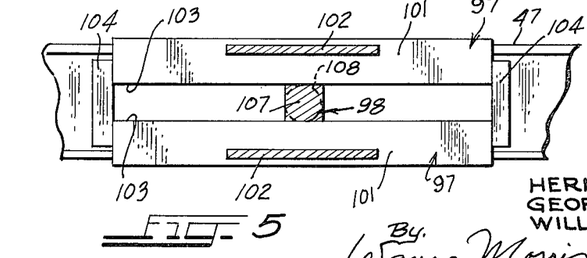
FIG. 5 is a view partially in cross-section taken substantially along the lines 5—5 of FIG. 3, showing the relationship of the gate suspension bolt with the suspension bracket.

This principle is embodied in the form shown in FIGS. 1, 4 and 6–9 and includes a shell having end channel members 55 of C-section on each side of the gate 47 and top channel members 56 of which only the top channel is shown (FIG. 4). The side channels have fixed to the legs 57 and 59, to form an enclosure 61 for the locking devices 51, a channel 63. The channel members 55, 56 and 57 are preferably formed of aluminum or the like to decrease the weight. If desired, of course, the channels may also be formed of a relatively light gauge steel.

The gate 47 further includes facing plates 65 and 67 between which there is sandwiched a honeycomb core 69. The core 69 is bonded to the inner surfaces of the facing plates 65 and 67 at each end thereof. The core 69 is advantageously formed from a kraft paper honeycomb and the facings 65 and 67 are formed from a thin gauge sheet aluminum. The paper honeycomb core 69 is not capable by itself of resisting the shear stresses associated with the load conditions encountered in the use of the latter in gate construction. At the same time, the facings 65 and 67 are not capable of resisting the axial stresses from bending without the core 69 because of the instability of their compressive skin.

However, when the core 69 and the facing plates 65 and 67 are employed as a unit with the shell structure as shown particularly in FIG. 4 with the outer edge portions of the facing plates rigidly fixed as by welding to the flanges of the channels 53 and 55 forming the sides, top and bottom of the shell, a structure capable of withstanding the design loads of the gate is formed. For example, when the gate is subject to bending conditions, the facing plate on which the bending condition is applied is stressed in tension, but this tensile force is applied by a continuous shear flow between the bonded interface of the facing plate and the core 69. Based on assumption of infinite transverse shear stiffness of the facing plate, the shear flow may be considered to be divided between the core 69 and the web of the side or end channel to which the facing plate is fixed in accordance with the shear moduli characteristics of the materials. However, due to the difference in the shear moduli of the web and the core, the core remains virtually unstressed and functions primarily as a continuous stiffener between the facing plates.

The carriage 49 includes generally a transversely extending pipe 71 on one end of which there is fixed a shaft 73, which rotatably supports a wheel 75. The wheel 75 is formed with a groove 77 which receives the upstanding flange 37 of rail 27. Also supported on the shaft 73 is one end of a wheel supporting bracket 79, on the other end of which there is fixed a shaft 81 supporting another wheel 75 similarly formed with a groove 77 receiving the flange 37. The wheels 75 are retained on their respective shafts 73 and 81 by way of cotter pins 83.

Fixed to the other end of pipe 71 is a shaft 85 having an enlarged end portion 87 received with the open end of the pipe 71 and a reduced end portion 89 rotatably supporting a wheel 90 retained thereon by way of cotter pins 83. For facilitating the installation of carriage 49 on the rails 27 and 29, the pipe 71 is formed with an elongate slot 91 which accommodates for sliding movement a screw 92 threaded into the enlarged shank 87 of the shaft 85. The wheel 90 is formed with a raised peripheral flange 93 which, when the shaft 85 is selectively positioned in the pipe 71 by way of the screw, rides along the inner side of the upstanding flange 37.

For suspending the gate 47 from the carriage there is provided the suspension bracket 51 which, as shown in FIGS. 1, 2, 3, 4 and 5, includes a sleeve member 95, a connector channel 96, a supporting plate 97, a suspension stud 98, and a fastening plate 99 fixed to the top channel 56 of the gate 47. The sleeve member may be formed from two complementary members 100 which, when clamped together loosely, encompass the pipe 71 so as to be freely slidable along the length thereof. The connector member 96 is substantially an inverted U-shaped channel and is fixed as by welding to the lower member 100 at its bight portion. The supporting plate 97 is formed from two strips of metal which are fixed to the legs 102 of the connector in spaced relation to form a groove 103 of which each end is closed by an end block 104.

The supporting pin 98 is secured at ts lower end in the fastening plate by way of a pin 105 extending through the webs of the channel 56 and the face plates 65 and 67. The supporting pin is formed with a head 106 and directly beneath the latter with a portion 107 of substantially rectangular section to prevent relative turning of the gate when the latter is moved lengthwise of the car as more fully to be explained hereinafter. The remainder of the pin may be of substantially circular section.

Referring now in particular to FIGS. 1–7 and 8, there are shown the locking devices 53. The locking devices are arranged in opposite side chambers 61 formed by the side channels 55 and 63 and include generally an actuating mechanism 110 disposed in openings 111 formed in each side of the enclosure 61 by a shell 114 as upper locking spud linkage 112 and a lower locking spud link 113.

The lock actuating mechanism 110 includes a lever 115 journaled intermediate its ends by way of a shaft 116 fixed on opposite sides of the enclosure wall 114. Fixed to one end of the lever 115 by way of a pin 116 is a rock arm 117 also journaled for movement on the shaft 116. The other end of the lever 115 is similarly connected to the rock arm 117 by way of a pin 119. The rock arm 118 is formed with an upstanding portion 120 to which there is fixed a preformed sheet metal handle 120. The interior end of the rock arm 118 is formed with a stop surface 122 which abuts against the end wall of the enclosure 111 to limit inward movement of the handle 121.

Turnably connected on the pin 116 between the lever 117 and rock arm 118 is an end of a strap 124 of the lower locking spud linkage 113. Connected to the lower end of the strap 124, as by pin 125, is a spud 126 of substantially circular section. The spud 126 is loosely guided by way of a substantially cylindrical housing fastened in the lower end of the enclosure 111. The protruding end of the spud is formed with a detent which is adapted to be received in openings spaced along the length of the keeper rails 31 and 33.

Similarly, the other end of the lever 115 is connected to the strap 130 of the upper locking spud linkage 112 by way of pin 119. The other end of the strap 130 supports a locking spud 131 which is formed with an axial opening and receives a slotted end 132 of the strap 130. Retaining the spud 131 on the strap 130 is a pin 133 which is slidably accommodated within the slot 132. Biasing the spud 131 upwardly is a spring 134 arranged between the spud 131 and a washer 137 fixed to the strap 130. The projecting end of the spud 131 is similarly formed with a detent which is receivable with spaced openings 136 formed in the rails 27 and 29. The locking spuds 131 may similarly be guided in cylindrical guide means 137 fixed in the enclosure 61.

For retaining the handle 121 of the lock actuating mechanism in its locked position, the upper end is provided with a spring biased latch 140 which is formed from a rod or the like and is reciprocably mounted in a hollow formed in the handle 121 and is movable into and out of a slot formed in the enclosure plate 111. The latch 140 is normally biased upwardly by way of a compression spring 142 disposed between a collar 141 fixed to the handle 121 and latch 140 respectively. For retracting the latch 140 out of its latched position, a hand rod 143 is fixed to the lower end of the latch 141 and is readily accessible.

In the normal locked position shown in the full line position of the elements, the locking spuds are engaged in the aligned openings 136 and 129 formed in the rails 27 and 29 and the keepers 31 and 33 respectively. In this position, the upper and lower spud linkages are arranged so that the gate is elevated away from the floor so that the suspending stud 98 fixed to the top of the gate is similarly elevated. In this manner, the weight of the gate 47 is carried entirely by the locking devices 53 on both sides of the gate. Moreover, it is to be noted that when the suspending stud 98 is thus elevated, the rectangular portion 107 formed is displaced out of the slot 103 and the circular section portion 108 is disposed therein. This feature is of significance for reasons which will become apparent hereinafter.

In use, the gates 47 are usually selectively positioned lengthwise of the car to divide the latter into compartments containing different types of lading. It has been common practice to provide sufficient gates to divide the car into at least three lengthwise extending compartments. With the load dividing arrangement of the present invention, wherein two gates 47 are employed to traverse the width of the car, it would be necessary to provide four gates as shown to obtain the usual three lengthwise compartments A, B and C, as shown in FIG. 11.

Figure 7A:
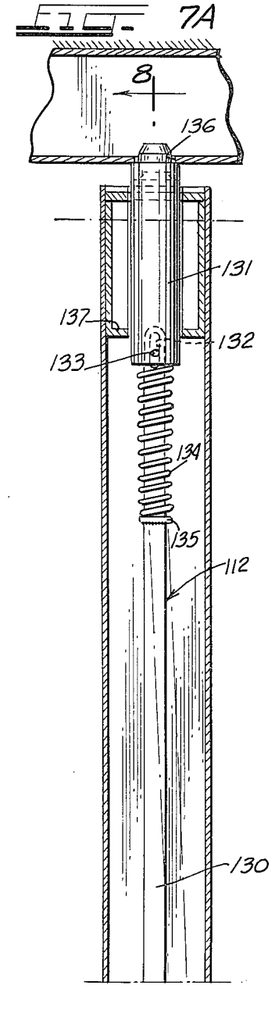
FIGS. 7A, 7B and 7C taken together are a view taken substantially along the line 7—7 of FIG. 1, showing the locking device disposed in the end channel of the gate.
Figures 7B, 7C:
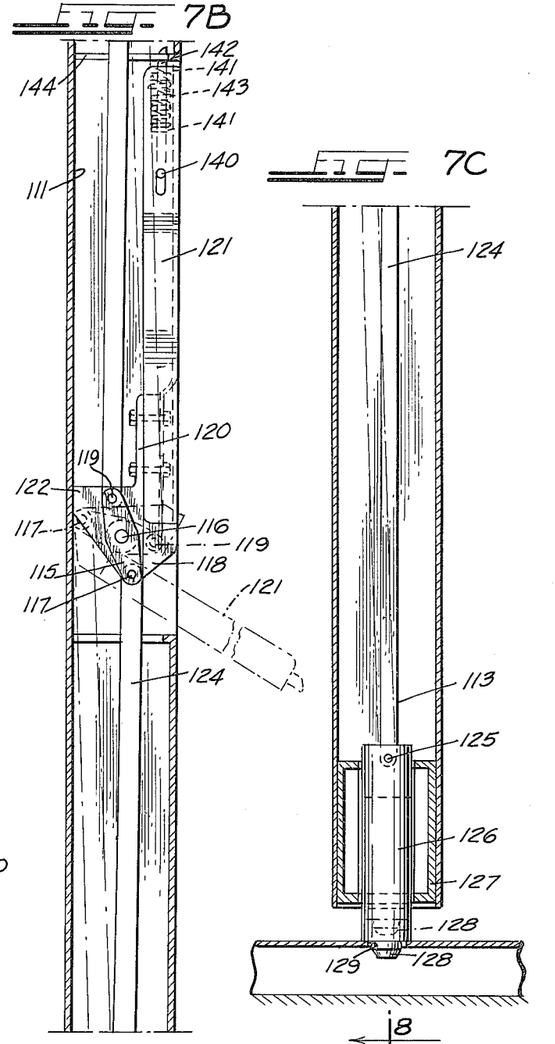
Figure 8A:
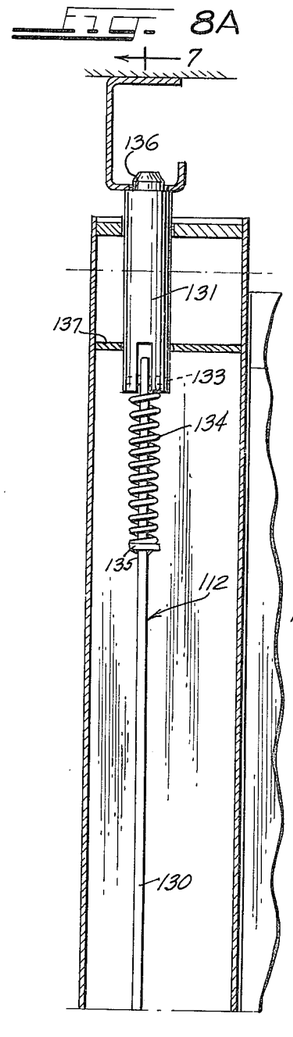
FIGS. 8A, 8B and 8C taken together are a view taken substantially along the lines 8—8 of FIG. 7.
Figure 8B:
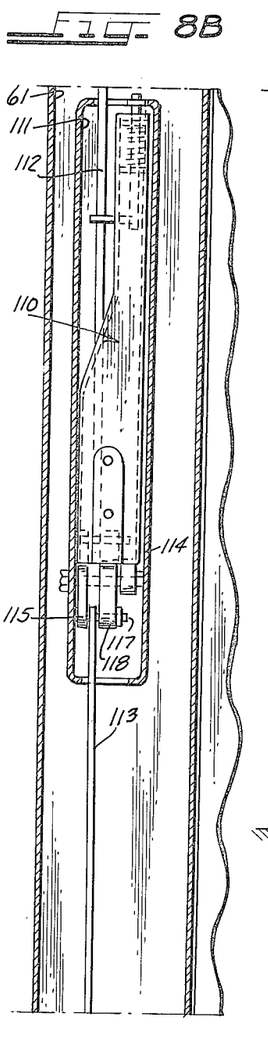
Figure 8C:
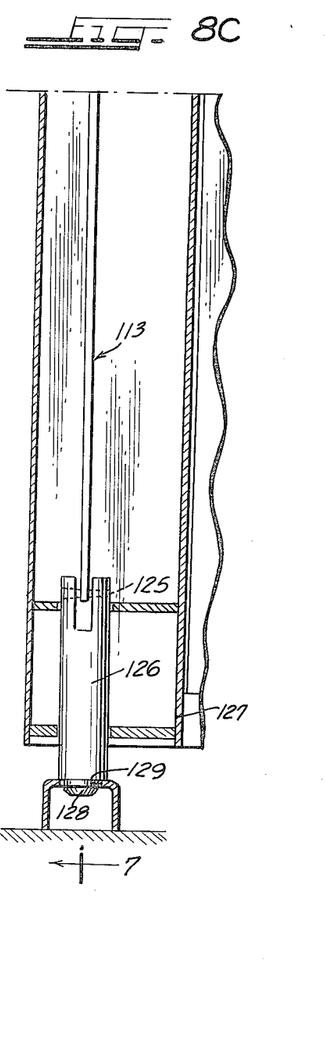
Figure 10:
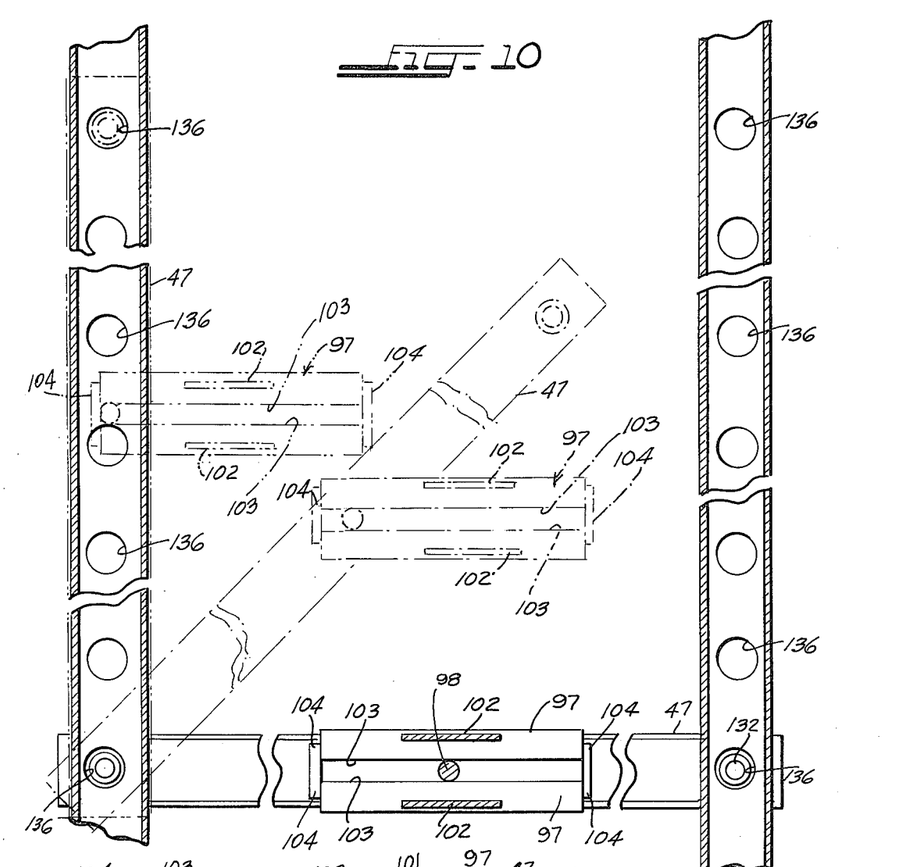
FIG. 10 is a diagrammatic plan view showing the relationship of the suspension bracket relative to the carriage and the gate as the gate is moved from a position transverse to the vehicle to a stored position adjacent the side wall.
Figure 11:
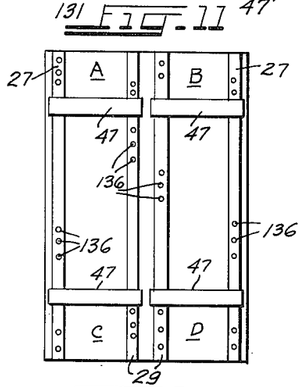
FIGS. 11, 12, 13, 14 and 15 are diagrammatic illustrations through a railway car showing some of the various operative positions of the load dividing devices typically employed in a railway vehicle.
Figure 12:
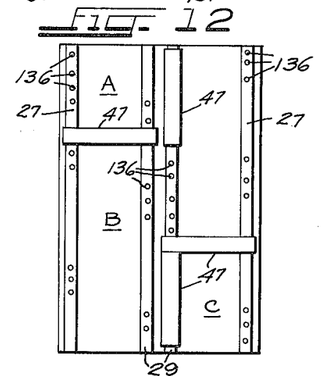
Figure 13:
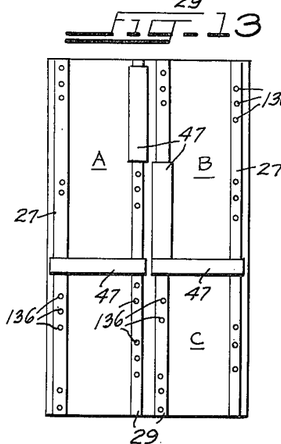
Figure 14:
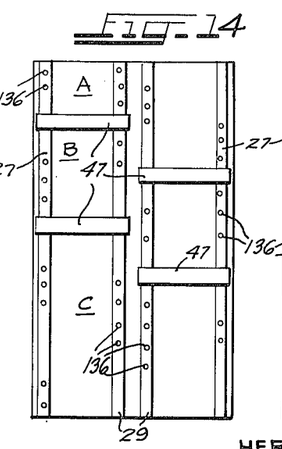
Figure 15:
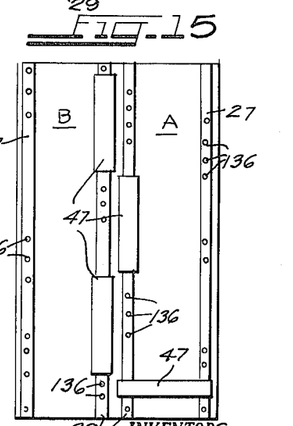

To selectively position the gates 47 as shown in FIG. 11, the gates 47 are individually positioned by moving the handles 131 of the locking devices on each side of a gate 47 to their release position, as shown in phantom lines of FIG. 7. In this position of the handle 131, the rockable lever to which the upper and lower spud linkages 112 and 113 are connected are effectively shortened in their overall length so that the spuds 131 and 126 are withdrawn from the openings in the rails 27 and 29 and keeper rails 31 and 33. Hence, the weight of the gate 47 is suspended from the suspension bracket 51 by way of the suspension stud 98 of which the head 106 is supported on the plates 102. In this position of the suspension stud 98, the rectangular portion is disposed with the slot 103. Since the stud 98 is fixed to the gate 47 by the pin 105 and the rectangular portion 109 is seated with the slot 103, turning of the gate 47 during lengthwise adjustment thereof is precluded.

The substantially horizontally disposed handles 131 are grasped and the gate 47, suspended from the bracket 51, is moved by way of the carriage 49 rollably supported by the rails 27 and 29 to its selective position.

When the gate 47 is in its selected position, the handles 121 are returned to their locked full line position shown. In this position, the lever 115 is rocked in a substantially vertical position so that the upper and lower spud linkages 112 and 113 are effectively lengthened such that when the lower detent 128 of the spud 127 enters the opening 129 in the keepers 31 and 35, the shoulder 146 bearing on the keepers limits the downward movement of the lower linkage 113 and effectively raises the gate 47 so that the suspension stud 98 is correspondingly raised such that the weight of the gate 47 is carried by the lower spud linkages 113. At the same time, the upper spuds 131 are seated in the openings in the rails 27 and 29, being biased therein by way of the biasing springs 134.

Figure 6:
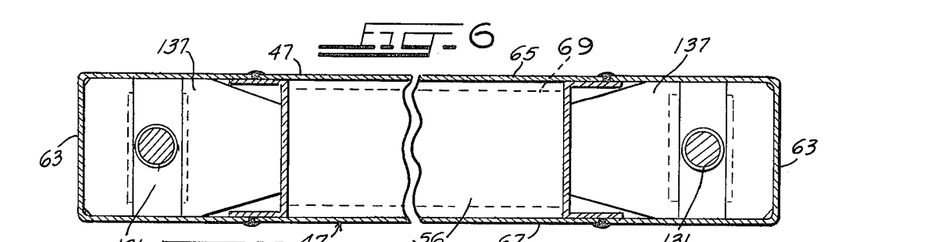
FIG. 6 is a fragmentary view partially in cross-section taken substantially along the lines 6—6 of FIG. 3.

Referring now in particular to FIG. 6, in the event it is desired to store the gate 47 in a position adjacent the side of the car, one of the locking devices 53 is released by moving the handle to its release position and the other locking device is retained in its locked position. As heretofore described in connection with the locking devices 53 in their locking position are operative to support the weight of the gate 46 so that the latter is elevated and the suspension stud 98 is raised from suspending contact with the suspension bracket 51. Hence, because of the lightweight construction of the gate 47, as heretofore described, one of the locking devices 53 is operative to support all of the weight of the gate similarly to the two locking devices 53. Under the conditions illustrated in FIG. 6 wherein the left locking device is in its locked position and the right locking device 53 is in its unlocked position, the weight of the gate 47 is supported by the left locking device. Moreover, with the weight of the gate 46 supported on the locking spud 126, the connecting stud 98 is elevated such that the circular section 108 is within the confines of the slot 103.

Accordingly, the gate 47 is freely pivotal about the axis defined by the upper and lower locking spuds 131 and 126 because the detents 138 and 132 are turnable in the openings formed in the rails 27 and keepers 31. As the gate 47 is turned about the left end locking device 53, the suspension pin 98 is freely movable within the slot 103 and is operative to engage the sides thereof so as to more or less push the carriage 49 on which the suspension bracket 51 is mounted in the direction of swinging movement of the gate 47. In this connection, it is to be observed that because the weight of the gate is removed from the supporting bracket 51, the members 100 loosely encompass the carriage pipe 71 so that the latter is free to move along the length thereof as the gate 47 turns. As shown in the dot-dash lines in the 45° position of the gate 47, the suspension pin 98 is operative to move the carriage 49 toward the end wall of the car. Thereafter the suspension pin 98 continues to slide within the slot 103 to a greater extent while, at the same time, continuing to move the carriage rearwardly until the supporting bracket 51 is located adjacent the side wall along with the gate 47. To hold the gate 47 in its stored position adjacent the side wall, the right locking device 53 is returned to its locked position.

From the foregoing it is readily apparent that the gates 47 may be selectively turned about either the right or left locking studs so as to provide different compartment arrangements, some of which are exemplified in FIGS. 11–15.

What is claimed is:

1. In a load dividing arrangement for a freight vehicle including a track means, a transverse extending carriage movable lengthwise of said vehicle along said track means comprising a gate, locking means along each side of said gate for locking said gate in a selective position lengthwise of said vehicle, said locking means including means operative to simultaneously raise said gate and provide a turning axis therefor when one of said locking means is in a locked position and the other of said locking means is unlocked and being operative to allow said gate to be lowered when both of said locking means are in an unlocked position, means connecting said gate with said carriage including support means operative to support the weight of said gate and to prevent relative turning of said gate with respect to said carriage when said gate is lowered, said support means including means permitting relative sliding movement of said supporting means along said transverse carriage means when said gate is raised so that said gate may be turned with said one locking means providing said turning axis.

2. The invention as defined in claim 1 in which said carriage includes a transversely extending crossbar and said gate connecting means comprises a sleeve loosely encompassing said cross bar, a transversely slotted supporting plate depending from said sleeve, and a suspending stud extending through said slot, and in which said suspending stud is fixed at its lower end to said gate.

3. The invention as defined in claim 2 in which said suspending stud is formed with an axial portion contoured to prevent turning of said gate relative to said carriage when said gate is lowered and a further axial portion contoured to permit relative turning of said gate with respect to said carriage when said gate is raised.

4. In a load dividing arrangement for a freight vehicle including a track means, a transverse extending carriage movable lengthwise of said vehicle along said track means comprising a gate, means connecting said gate to said carriage, said gate including locking means along each side of said gate for locking said gate in a selective position lengthwise of said vehicle, said locking means including means operative to raise said gate relative to said connecting means and provide a turning axis therefor when said locking means is in a locked position and being operative to permit said gate to be lowered in an opposite direction relative to said connecting means when said locking means is in an unlocked position, said means connecting said gate with said carriage including means operative to support the weight of said gate and prevent relative turning of said gate with respect to said carriage when said gate is unlocked and including transversely slidable means permitting relative sliding movement of said connecting means along said transverse carriage means when one of said locking means is locked and the other of said locking means is unlocked so that said gate may be turned about said unlocked locking means.

5. In a freight vehicle having a substantially cubic volume defined by oppositely disposed pairs of sides and end walls, a ceiling and a floor, an arrangement for dividing said volume into smaller cubic volumes comprising longitudinally extending track means, carriage means supported on said track means for movement lengthwise of said vehicle, a gate, means supporting said gate from said carriage means, said supporting means including means permitting said gate and said carriage means to move relative to each other when said gate is turned between a position transversely to said side walls and a position parallel to said side walls, said supporting means further including means preventing turning of said gate from said transverse position during lengthwise movement of said carriage means, locking means along each side of said gate and extending between said ceiling and floor for locking said gate and thereby said carriage against movement along said track means in a selective position transversely to said vehicle, said locking means being independently operable and each including means to provide a turning axis for said gate and means to simultaneously elevate said gate relative to said means preventing turning of said gate when a selective one of said locking means is in said locked position and the other of said locking means is in an unlocked position so that said gate may be moved and turned relative to said carriage and thereby on said turning axis provided by said selective one of said locking means to a position parallel to the lengthwise axis of said vehicle.

6. In a freight vehicle having a substantially cubic volume defined by oppositely disposed pairs of sides and end walls, a ceiling and a floor, an arrangement for dividing said volume into smaller cubic volumes comprising longitudinally extending track means, carriage means supported on said track means for movement lengthwise of said vehicle, a gate, means supporting said gate from said carriage means along a top edge substantially intermediate the sides thereof, said supporting means including means permitting said gate and said carriage means to move relative to each other when said gate is turned between a position transversely to said walls and a position parallel to said side walls, said supporting means means further including means preventing turning of said gate from said transverse position during lengthwise movement of said carriage means and locking means along each side of said gate and extending between said ceiling and floor for locking said gate and thereby said carriage against movement along said track means in a selective position transversely to said vehicle, said locking means being independently operable and each including means to provide a turning axis for said gate and means to simultaneously elevate said gate relative to said means preventing turning of said gate when a selective one of said locking means is in said locked position and the other of said locking means is in an unlocked position so that said gate may be moved and turned relative to said carriage and thereby on said turning axis provided by said selective one of said locking means to a position parallel to the lengthwise axis of said vehicle.

7. In a freight vehicle having a substantially cubic volume defined by oppositely disposed pairs of sides and end walls, a ceiling and a floor, an arrangement for dividing said volume into smaller cubic volumes comprising a pair of longitudinally extending rails mounted on said ceiling, carriage means including a transversely extending bar slidably mounted on said tracks for movement lengthwise of said vehicle, a rectangular gate, supporting means slidably mounted on said bar supporting said gate from said carriage means so that said gate and said carriage means may be moved relative to each other when said gate is turned between a position transversely to said side walls and a position parallel to said side walls, said supporting means including means suspending said gate in said transverse position during lengthwise movement of said carriage means and for preventing turning of said gate relative to said carriage during the lengthwise movement thereof, locking means along each side of said gate extending between said ceiling and floor for locking said gate and thereby said carriage against movement along said track means in a selective position transversely to said vehicle, said locking means being independently operable and each including means to provide a turning axis for said gate and means to simultaneously elevate said gate relative to said means preventing turning of said gate when a selective one of said locking means is in said locked position and the other of said locking means is in an unlocked position so that said gate may be moved and turned relative to said carriage and thereby on said turning axis provided by said selective one of said locking means to a position parallel to the lengthwise axis of said vehicle.

8. In a freight vehicle having a substantially cubic volume defined by oppositely disposed pairs of side and end walls, a ceiling and a floor, an arrangement for dividing said volume into smaller cubic volumes comprising longitudinally extending track means mounted on said ceiling, a rectangular gate suspended between said floor and ceiling, means movable along said track means and supporting said gate substantially intermediate its width for longitudinal movement of said car to a selective position in a plane transverse to said side walls and permitting said movable means and said gate to move relative to each other when said gate is turned between said transverse position and a position parallel to said side walls, and locking means located along the opposite sides of said gate cooperating with said floor and ceiling and independent of said supporting means, said locking means being independently operable and including means operative when one of said locking devices is in a locked position and the other of said locking devices is in an unlocked position to displace said gate from suspending engagement with said supporting means and simultaneously to provide a turning axis about said locking means in said locked position for turning said gate into a plane parallel to the longitudinal axis of said car and relative to said supporting means.

References Cited by the Examiner

UNITED STATES PATENTS

| | | | |
|---|---|---|---|
| 2,516,527 | 7/1950 | Oltz | 105—376 |
| 3,017,843 | 1/1962 | Loomis et al. | 105—376 |
| 3,018,741 | 1/1962 | Loomis et al. | 105—376 |
| 3,162,146 | 12/1964 | Knippel et al. | 105—376 |

ARTHUR L. LA POINT, *Primary Examiner.*